United States Patent [19]
Morin et al.

[11] Patent Number: 5,440,113
[45] Date of Patent: Aug. 8, 1995

[54] APPARATUS FOR SERVO-CONTROLLING THE BIAS VOLTAGE OF A LIGHT SOURCE

[75] Inventors: Stéphane Morin, Lannion; Franck Giraud, Pleumeur Bodou, both of France

[73] Assignee: ALCATEL CIT, Paris, France

[21] Appl. No.: 266,578

[22] Filed: Jun. 28, 1994

[30] Foreign Application Priority Data

Jul. 1, 1993 [FR] France .................. 93 08068

[51] Int. Cl.⁶ ............................ H01S 3/10
[52] U.S. Cl. .................. 250/205; 359/187; 372/33
[58] Field of Search ......... 250/205; 372/26, 28, 29, 31, 32, 33, 38; 385/1, 2, 3; 359/128, 118, 180, 181, 182, 183, 187

[56] References Cited

U.S. PATENT DOCUMENTS

| | | |
|---|---|---|
| 4,162,398 | 7/1979 | Kayanuma . |
| 4,253,734 | 3/1981 | Komurasaki et al. . |
| 4,698,817 | 10/1987 | Burley . |
| 5,003,624 | 3/1991 | Terbrack et al. ............... 455/618 |
| 5,208,817 | 4/1993 | Kao et al. ......................... 372/26 |

FOREIGN PATENT DOCUMENTS

0448832A3 10/1991 European Pat. Off. .
59-17527 1/1984 Japan .

OTHER PUBLICATIONS

T. Kataoka et al, "Novel Automatic Bias Voltage Control for Travelling Wave Electrode Optical Modulators", *Electronics Letter*, vol. 27, No. 11, May 23, 1991, pp. 943–945.

French Search Report FR 9308068.

*Primary Examiner*—David C. Nelms
*Assistant Examiner*—John R. Lee
*Attorney, Agent, or Firm*—Sughrue, Mion, Zinn, Macpeak & Seas

[57] ABSTRACT

A particular embodiment comprises:

a semiconductor laser;

a Mach-Zehnder type modulator;

an analog adder for adding a modulation signal representing binary data with a DC bias voltage;

a coupler for taking off a fraction of the modulated light signal;

a photodiode;

an amplifier;

a bandpass filter tuned to a frequency equal to the binary data transmission rate;

an amplifier;

an amplitude detector;

an amplifier; and a microprocessor associated with an analog-to-digital converter and with a digital-to-analog converter to modify the bias voltage so as to cause the amplitude of the spectrum line extracted by the filter and the amplitude detector to remain below a fixed threshold value. The invention is applicable to digital data transmissions.

3 Claims, 3 Drawing Sheets

APPARATUS FOR SERVO-CONTROLLING THE BIAS VOLTAGE OF A LIGHT SOURCE

FIELD OF THE INVENTION

The invention relates to regulating the operation of a light source whose power of emission is modulated by a control voltage that is the sum of a DC voltage called the "bias voltage" and a variable voltage called the "modulation voltage" and that is capable of taking up at least two discrete values to represent a string of digital values at a fixed rate. The invention relates more particularly to sources for which the characteristic (power of emission as a function of control voltage) is used in a zone where it has a center of symmetry about a "optimum" value of the bias voltage and that corresponds to a control voltage varying over a range of values centered on said optimum value.

BACKGROUND OF THE INVENTION

Two types of source may have that kind of characteristic:

sources having internal modulation, e.g. a semiconductor laser, in which power of emission is modulated by varying the electrical current injected into the laser; or sources having external modulation, such as a laser that emits continuously and that is associated with an electrically controllable amplitude modulator. For example, the modulator may be an interferometer of the Mach-Zehnder type, or of the electro-absorption type.

FIG. 1 is a block diagram of an externally modulated light source. It comprises: a semiconductor laser 1; a Mach-Zehnder type modulator 2; and an analog adder 3. The laser 1 emits a light beam of constant power $P_0$, which is applied to one input of the modulator 2. The modulator has an electrical control input on which it receives a voltage $V_c$ supplied by the output from the adder 3. An optical output of the modulator 2 provides an amplitude-modulated light beam of variable power P. The adder 3 sums the DC bias voltage $V_b$ with a modulation voltage $V_m$ representing a string of binary data.

FIG. 2 shows the characteristic of that source, i.e. it is a plot of the output power P as a function of the control voltage $V_c$. The plot $P(V_c)$ of a perfect modulator of the Mach-Zehnder type is a sinewave of period $2V_p$, where the value of the half period $V_p$ is inherent to the structure of the modulator. To achieve modulation, the characteristic is made use of over a portion of the sinewave that has a slope of constant sign, e.g. the region AB, with this being done by placing the operating point on a point of inflection C of the sinewave. This characteristic is liable to drift, particularly under the influence of temperature, with the characteristic moving parallel to the abscissa axis. Consequently, the portion ACB of the sinewave moves relative to the bias voltage which is taken as consisting a fixed point.

To transmit a digital signal, e.g. including two or three discrete levels, it is not absolutely essential for modulation to be linear. It is therefore possible to make use of the entire region AB so as to achieve maximum modulation depth. The output power P then varies between 0 and $P'_0$ which is the maximum power delivered by the modulator when it has the power $P_0$ applied to its input.

A method of obtaining such modulation consists in applying a control voltage $V_c$ to the control input of the modulator, where the voltage $V_c$ has an amplitude of $\pm \frac{1}{2}V_p$ centered on a value $V_0$ corresponding to the point of inflection C which is the center of symmetry of the region AB. Under such circumstances, it is necessary to apply a bias voltage $V_b = V_0$ to one of the inputs of the adder 3, and to apply a modulation voltage $V_m$ of amplitude $\pm \frac{1}{2}V_p$ and centered on zero voltage to the other input.

In the example shown in FIG. 2, the voltage $V_0$ constituting the optimum bias voltage has some arbitrary positive value. In practice, the voltage $V_0$ is not constant. It drifts, in particular as a function of the temperature of the modulator 2. The entire characteristic $P(V_c)$ moves parallel to the abscissa axis $V_c$. If the bias voltage $V_b$ is fixed, then it cannot coincide with the optimum voltage $V_0$ when it drifts. Consequently, the emitted light signal is deformed, either in the vicinity of point A or else in the vicinity of point B of the plot of $P(V_c)$.

FIG. 3 shows this deformation phenomenon where solid lines are used to show the output power P(t) as a function of time t, for a binary signal taking the values 101 when the drift in the characteristic has caused the operating point to move towards point A of the characteristic. The output signal then has a low level of power $P_1$, that is non-zero, and a high level of power that passes twice through the value $P'_0$, but that includes a relative minimum between those two maxima.

The transmitted signal is deformed since the high level is no longer of constant power. In addition, the power difference $P'_0 - P_1$ is smaller than when the operating point remains accurately in coincidence with the center of symmetry C of the characteristic. In FIG. 3, the waveform of the output signal under such circumstances is shown in dashed lines.

This drift in the characteristic causes the eye diagram to close up somewhat, thereby increasing the transmission error rate. That is why it is necessary to servo-control the bias voltage $V_b$ to variations in the voltage $V_0$ corresponding to the center of symmetry.

Two methods are known of servo-controlling the bias voltage $V_b$ on the optimum value $V_0$.

A first servo-control method is described in the article "Novel automatic bias voltage control for travelling-wave electrode optical modulators", Electronics Letters, Vol. 27, May 23, 1991 by Kataoka et al. In that method, a second light flux passes through the modulator in the opposite direction to the light flux being modulated by the data to be transmitted. This second light flux is also modulated, so by observing its modulation it is possible to servo-control the bias voltage.

The main drawback of that method is the use of an additional light source and of two polarization-maintaining couplers which are difficult to connect to the modulator. As a result there are problems with the reliability of the apparatus. In addition, such a device poses problems of bulkiness and of insertion losses in the two optical couplers; it is also expensive.

A second servo-control method is described in the article "Automatic bias control circuit for Mach-Zehnder modulator", IEICE, Spring National Convention Record, B-976, 1990, by Kuwata et al. A laser emitter emits light flux of constant power which is applied to a Mach-Zehnder modulator. A signal representing binary data at high frequency is applied to a high frequency modulator that also receives a sinewave signal at low frequency and small amplitude. The high frequency signal modulated by the low frequency signal is applied to the Mach-Zehnder modulator. A fraction of the light signal output from the modulator is taken off by an optical coupler and is then applied to a detection diode which is followed by a phase comparator. The phase comparator compares the phase of the detected signal with that of the low frequency signal. A lowpass filter filters the signal delivered by the phase comparator. The filtered signal represents the voltage difference that exists between the bias voltage applied to the Mach-Zehnder modulator and the voltage at which modulation is optimal, i.e. the DC voltage $V_0$. This voltage difference can be used to change the bias voltage.

Thus, in that second method, the peak-to-peak amplitude of the modulation signal is modulated about its mean value by a sinewave signal of small amplitude and low frequency. Such modulation of the modulation signal induces low frequency sinewave modulation of the mean light power. The phase position of said sinewave modulation relative to the sinewave signal applied to the high frequency modulator has the same sign as $V_b - V_0$. By determining this phase difference it is possible to servo-control $V_b$ on $V_0$.

Unfortunately, implementing that method requires a Mach-Zehnder modulator to be used with its gain being modulated by the low frequency signal. Such low frequency modulation behaves like noise relative to the transmitted signal, thereby degrading the signal-to-noise ratio. Furthermore, it becomes very difficult to make a high frequency electronic modulator for amplitude modulating the high frequency signal with a low frequency signal when the rate at which the digital values are transmitted is very high.

OBJECT AND SUMMARY OF THE INVENTION

The object of the invention is to provide servo-control apparatus that does not have the drawbacks of known apparatuses.

The present invention provides an apparatus for servo-controlling the bias voltage of a light source whose power of emission is modulated by a control voltage which is the sum of a DC voltage called the "bias voltage" and a varying voltage called the "modulation voltage", that is centered on a zero voltage; said modulation voltage being capable of taking at least two discrete values to represent a string of digital values having a fixed rate; the power emitted by said source being a function of the control voltage, which function is at least approximately symmetrical about an "optimum" value of the bias voltage when the control voltage varies over a range of values centered on said optimum value of the bias voltage; and said optimum voltage being liable to drift;

the apparatus including:

. means for taking off a fraction of the optical signal emitted by the source and for converting it into an electrical signal referred to as the "take-off" signal;

. means for detecting any possible difference in need of correction between the value of the bias voltage and its optimum value; and . means for deducing a new value of the bias voltage if there is a difference to be corrected, which new value is closer to the optimum value;

wherein the means for detecting possible difference comprise:

. means for determining the amplitude of a spectrum line in the take-off signal that is centered on a frequency equal to the rate of the digital values; and . means for determining whether or not there exists a difference that needs to be corrected, as a function of the amplitude of said spectrum line.

The servo-control apparatus as characterized above is particularly simple to implement. It suffices to interpose a single coupler at the output from the light source in order to extract a fraction of the emitted light signal. The other means required for implementing the invention are simple electronic means.

BRIEF DESCRIPTION OF THE DRAWINGS

The invention will be better understood and other characteristics will appear in the light of the following description of an embodiment given with reference to the accompanying drawings in which.

MORE DETAILED DESCRIPTION

Figure 1:
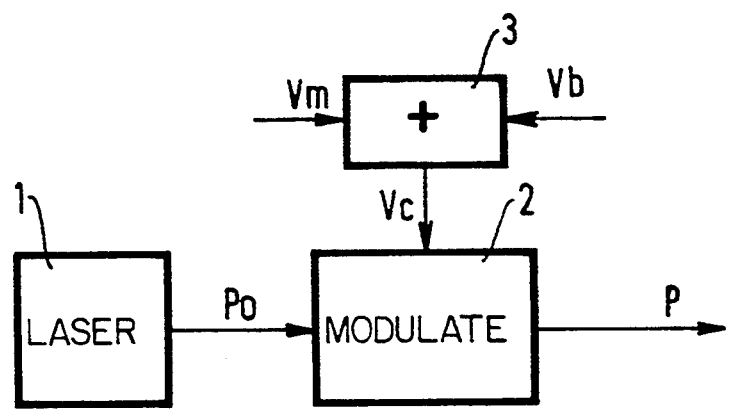
FIGS. 1 to 3 are described above and illustrate the prior art.

This embodiment comprises:

. a light source 14 constituted by a semiconductor laser 11, a Mach-Zehnder type modulator 13, and an analog adder 12; the laser 11 provides light flux at constant amplitude to an optical input of the modulator 13, which modulator is controlled by a control voltage $V_c$ delivered by an output from the adder 12, and in turn delivers an amplitude modulated light flux; the adder 12 has a first input 10 on which it receives a modulation signal constituted by a voltage $V_m$ that takes either the value $+\frac{1}{2}V_p$ or else the value $-\frac{1}{2}V_p$; and a second input on which it receives a bias voltage $V_b$;

. a digital-to-analog converter 15 which provides the voltage $V_b$ in analog form to the source 14;

. a microprocessor 16 that includes a program memory (not shown); the microprocessor has an output coupled to an input of the digital-to-analog converter 15 via which it delivers a binary word representing the value of the voltage $V_b$, which it determines by executing the program stored in said memory;

. an analog-to-digital converter 17 having an output coupled to the input of the microprocessor 16 and supplying it with a binary word;

. a light coupler 18 having a light input connected to the output from the source 14, said output being constituted by the output of the modulator 13; a first output 25 of the coupler delivering 90% of the power provided by the modulator 13; and a second output providing 10% of the power delivered by the modulator 13;

. a photodiode 19 whose light input is connected to the second output of the coupler 18;

. an electronic amplifier 20 having an input connected to the output of the photodiode 19 to amplify an electrical signal delivered by the photodiode 19 and representing the light signal taken off by the coupler 18;

. a bandpass filter 21 tuned to the rate of the binary data transmitted by the source 14, and having a very narrow passband;

. an electronic amplifier 22 having an input connected to the output of the filter 21 and amplifying the signal filtered by said filter;

. an amplitude detector 23 having an input connected to the output of the amplifier 22 and delivering an analog electrical signal representative of the amplitude of the signal delivered by the filter 21 with a time constant that is much longer than the period of the binary data so as to eliminate fluctuations in amplitude due to changes in the values of the binary data; and . an amplifier 24 having an input connected to the output of the amplitude detector 23; an output of the amplifier 24 delivering an analog signal constituted by a voltage H to an input of the analog-to-digital converter 17.

The same input of the analog-to-digital converter 17 receives in alternation the bias voltage $V_b$. The microprocessor 16 controls analog gates (not shown) to apply the voltage H and the voltage $V_b$ alternately to the input of the converter 17. In this way, the same converter is used to convert both voltages $V_b$ and H.

For example, if the binary data rate is 5 Gigabets per second (Gb/s), then the filter 21 is tuned to a frequency of 5 GHz and its Q-factor is equal to 1,000. The voltage H represents the amplitude of the spectrum line centered on the frequency of 5 GHz.

Figure 2:
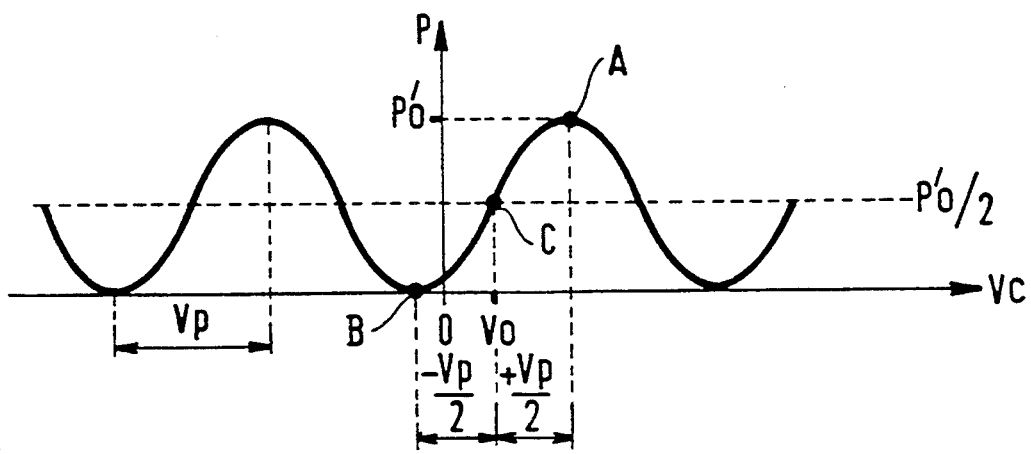

This line has zero amplitude when the low and high levels corresponding to the transmitted bits are of equal duration within the optical signal taken off by the coupler 18. In the modulation signal applied to the input 10, the high and low levels are of equal duration since all of the bits are of equal duration by definition. To enable this characteristic to be maintained in the modulated light signal as delivered by the modulator 13, it is necessary and sufficient for the operating points to be centered on the center of symmetry C shown in FIG. 2. Since, to a first approximation, the non-linearity of the characteristic is the same in the vicinity of both points A and B, the durations of the high levels and of the low levels are identical.

Figure 3:
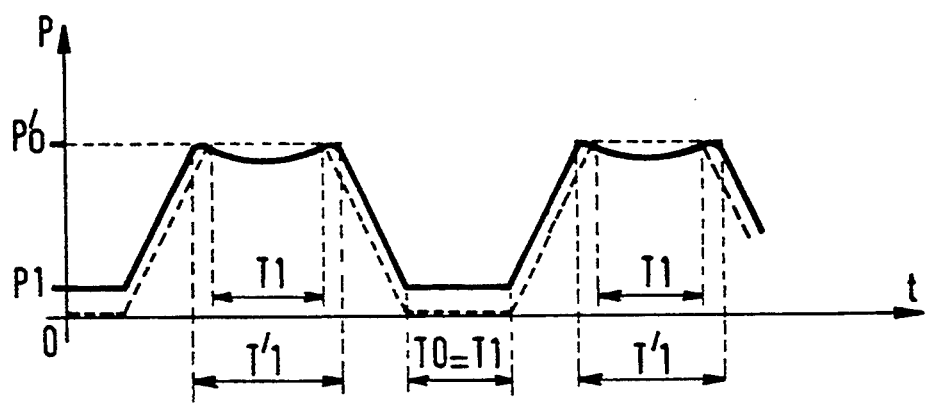
Figure 4:
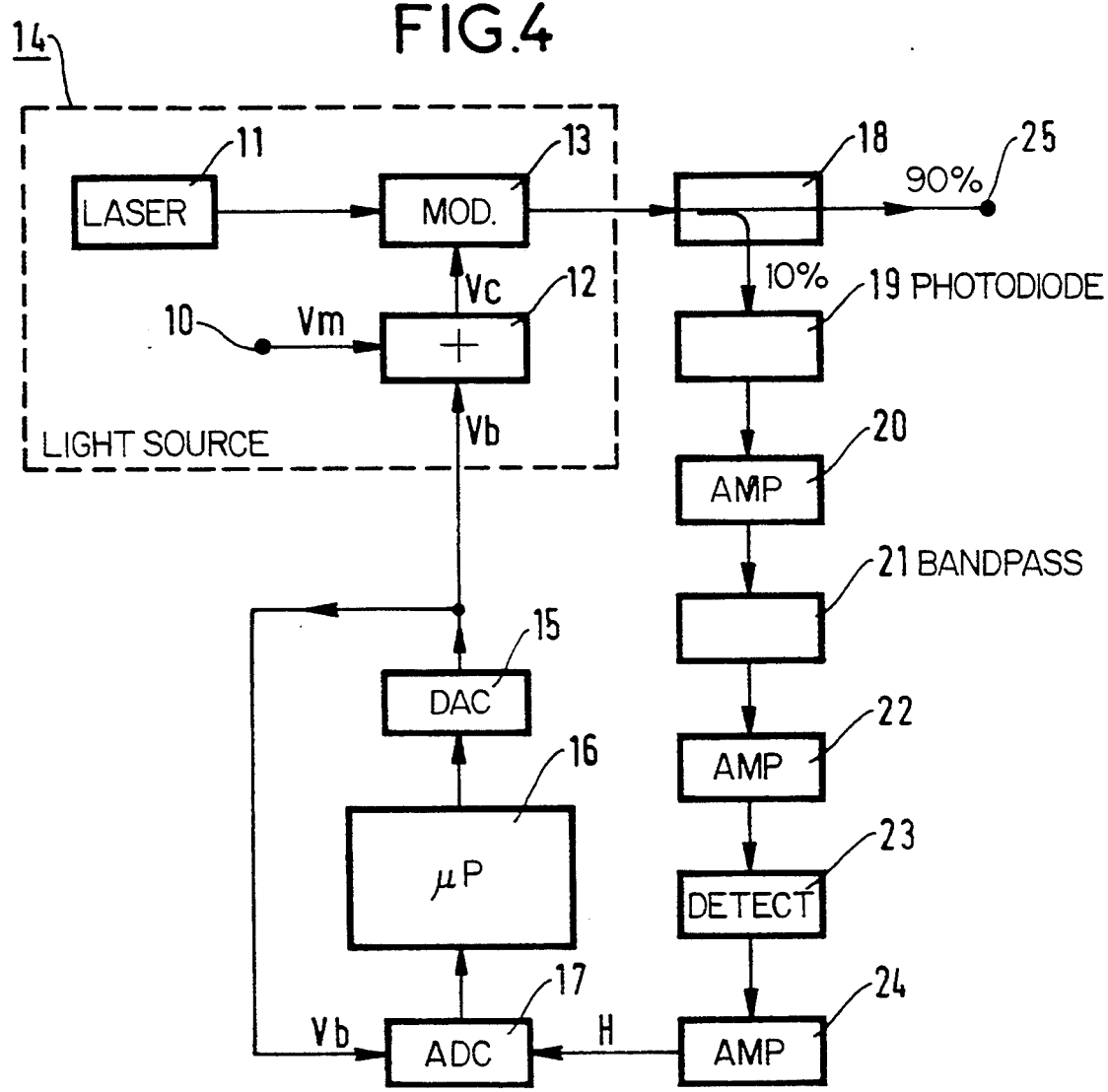
FIG. 4 is a block diagram of an embodiment of apparatus of the invention.

However, if the operating point is not situated at point C, then the durations of the high levels and the durations of the low levels are affected in different ways. In the example shown in FIG. 3, it can be seen that the duration of the high levels, $T'_1$, is greater than the duration $T_1$ they would have had if there had been no deformation in the vicinity of point A of the characteristic. Meanwhile the low level has retained the same duration $T_0 = T_1$.

As soon as the high levels and the low levels no longer have the same durations, then a line appears in the spectrum of the signal extracted from the modulated light flux that corresponds to the binary data rate. When said line has an amplitude greater than the value of a fixed threshold, selected to have a level that is great enough to distinguish it from noise, and corresponding to non-negligible deformation in the waveform of the modulated signal, then the microprocessor 16 determines a new value for the bias voltage $V_b$, by changing the current value in the appropriate direction for reducing the amplitude of said spectrum line. It reiterates its choice for a new value of $V_b$ until the amplitude of the spectrum line has gone below the threshold value.

Figure 5:
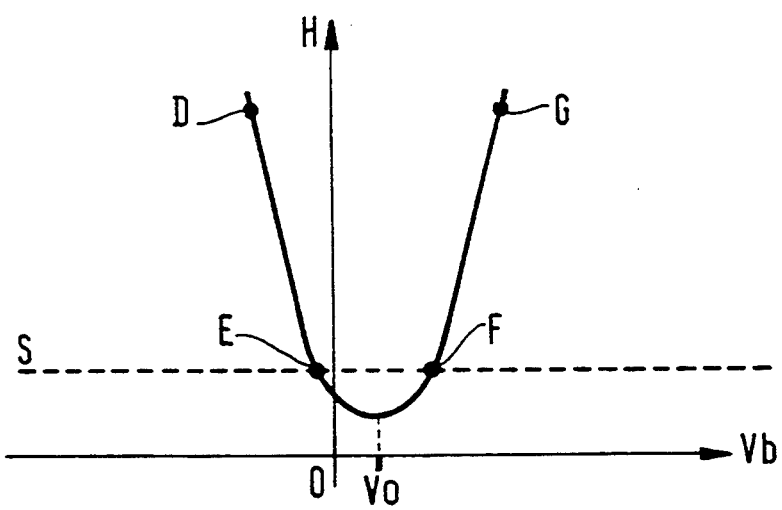
FIG. 5 is a plot showing how said embodiment operates.

FIG. 5 is a plot of the voltage H delivered by the amplifier 24 and representing the amplitude of the spectrum line as a function of the bias voltage $V_b$. This plot is approximately in the form of a parabola whose axis of symmetry is parallel to the ordinate axis H and whose minimum is situated at abscissa value $V_0$ which is the optimum bias voltage at the instant under consideration. The entire plot is moved parallel to the abscissa axis $V_b$ when the operating characteristic of the modulator 13 is itself translated because of drift. A threshold voltage S defining the fixed threshold value for the spectrum line is greater than the value of H which corresponds to the optimum bias voltage $V_0$.

The straight line of equation $H = S$ intersects the plot at two points, E and F. When the value of H is situated in the portion EF of the plot, it is below the threshold S and the bias voltage is considered as being satisfactory, so the microprocessor 16 does not seek to change it. However, when the value of H lies on the branch DE of the plot, which is the branch having negative slope, then the microprocessor 16 increases the algebraic value of the bias voltage $V_b$ so as to bring the value of H back into the portion EF of the plot. When the value of H is situated on the branch FG of the plot, which is the branch having positive slope, then the microprocessor 16 reduces the algebraic value of the bias voltage $V_b$ until said value of H is brought back into the portion EF of the plot.

Figure 6:
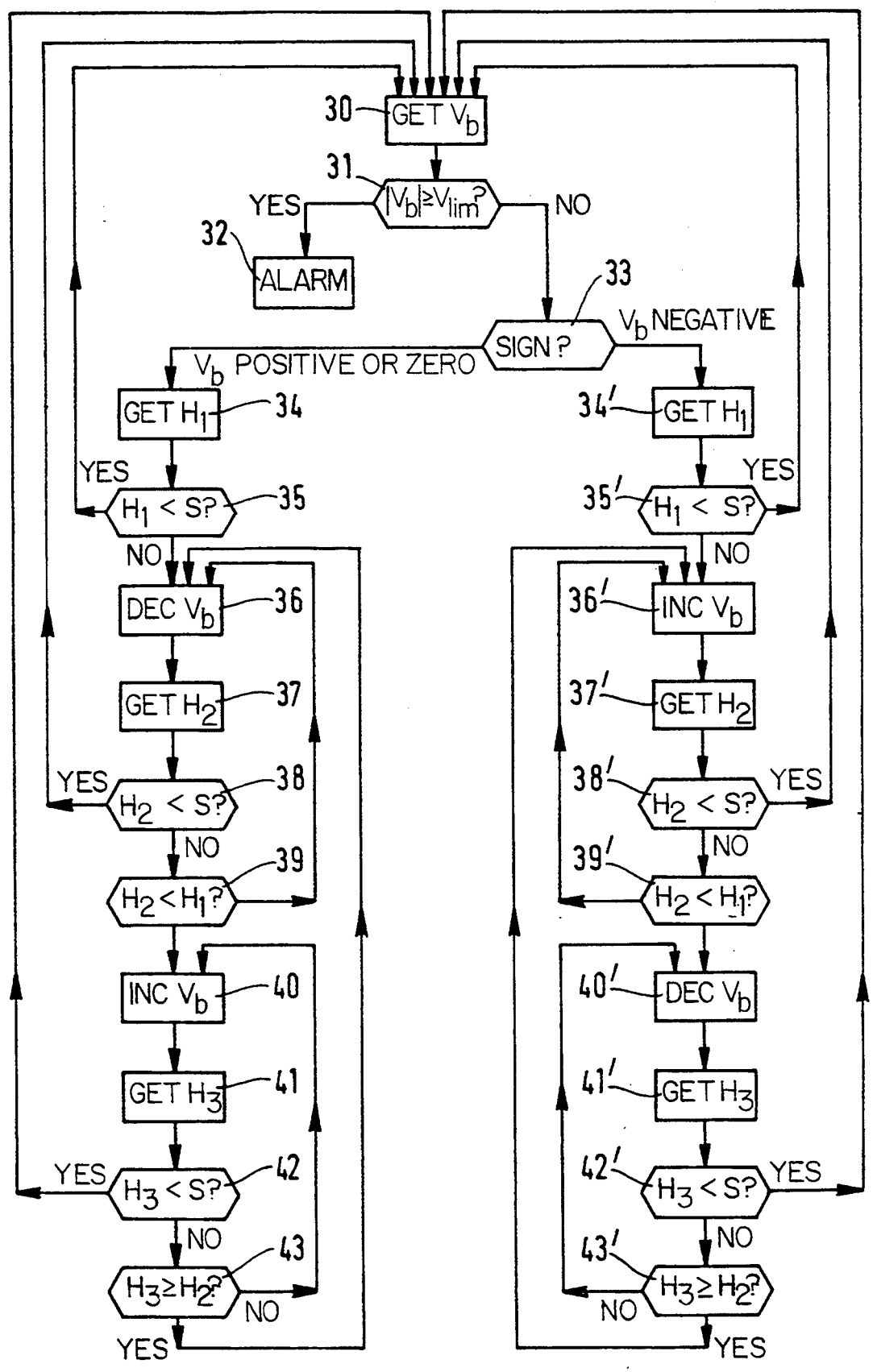
FIG. 6 is a flow chart of the operations it performs in succession while in operation.

FIG. 6 is a flow chart of the operations performed by the microprocessor 16 to apply the above method of servo-control. The flow chart begins at 30 by reading the current algebraic value $V_b$ of the bias voltage. The absolute value of $V_b$ is compared with a limit value $V_{lim}$ in operation 31. If the limit value is reached or exceeded, then an alarm is triggered by operation 32.

If the limit value is not reached or exceeded, then the microprocessor determines the sign of the value $V_b$. If the sign is positive or if $V_b$ is zero, then it performs operations 34 to 43, otherwise, the sign is negative and it performs operations 34' to 43'.

Operation 34 consists in measuring the value $H_1$ of the voltage H representing the amplitude of the spectrum line at 5 GHz. Operation 35 consists in comparing the value $H_1$ with the fixed threshold value S. If $H_1$ is less than the fixed threshold value S, then the microprocessor 16 decides not to change the current value $V_b$ of the bias voltage and it starts over the operations from the beginning of the flow chart, i.e. at 30 it reads the value $V_b$ of the bias voltage provided by the output of the digital-to-analog converter 15.

If the value $H_1$ is greater than or equal to the value S, then the microprocessor 16 in operation 36 decides to decrement the value $V_b$ by one unit. Thereafter, in operation 37 it measures the new value $H_2$ of the voltage provided by the output of the amplifier 24. In operation 38 it compares the value $H_2$ with the threshold value S. If the value $H_2$ is less than the threshold value S, the microprocessor 16 decides to cease changing the value $V_b$ of the bias voltage, and it reiterates operation 30 situated at the beginning of the program.

If the value $H_2$ is greater than or equal to the threshold value S, then the microprocessor 16 compares the value $H_2$ with the value $H_1$ in an operation 39. If $H_2$ is less than $H_1$, i.e. if the amplitude of the spectrum line has become smaller, then the microprocessor 16 decides to further reduce the algebraic value $V_b$ of the bias voltage by reiterating operation 36. Otherwise, since operation 36 has had no success, the microprocessor decides to increment the value of $V_b$ by one unit in operation 40. Thereafter in operation 41 it measures a new value $H_3$ of the voltage delivered by the output of the amplifier 24. Then it compares the value $H_3$ with the threshold value S, in operation 42. If the value $H_3$ is less than the threshold value S, the microprocessor 16 decides not to change the current algebraic value $V_b$ of the bias voltage, and it reiterates operation 30 situated at the beginning of the flow chart.

If the value $H_3$ is greater than or equal to the threshold value S, then the microprocessor 16 must change the bias voltage again, but without knowing in which direction, so it compares the value $H_3$ with the value $H_2$ in operation 43. If $H_3$ is greater than or equal to $H_2$ that means the most recent incrementation of the value $V_b$ in operation 40 was not a success. Consequently, the microprocessor 16 decides to decrement the value $V_b$ by operation 36. If the value $H_3$ is less than the value $H_2$, that means that the incrementation of the value $V_b$ in operation 40 was a success. Consequently, the microprocessor 16 decides to repeat operation 40.

Operations 34' to 43' are respectively identical to operations 34 to 43 except that decrementing in step 36 is replaced by incrementing the value of $V_b$ in step 36', and incrementing in step 40 is replaced by decrementing the value of $V_b$ in step 40', thereby taking account of the fact that the algebraic value of $V_b$ does not have the same sign in operations 34' to 43'.

It should be observed that the servo-control apparatus of the invention thus compensates for possible drift in the bias voltage source, and also of the zero points of the converters 15 and 17.

The person skilled in the art is capable of implementing the servo-control means differently, in particular by employing a hard-wired logic circuit instead of a microprocessor, or else by using circuits that are entirely analog.

It is also possible to make use of the amplitude of the spectrum line in a different manner, for example by comparing it with two threshold values so as to introduce hysteresis in the process for deciding to change the bias voltage.

The invention is applicable to any other digital modulation signal including symmetrical discrete levels about a zero value, in particular a signal that includes three levels: 0, $+\frac{1}{2}V_p$, $-\frac{1}{2}V_p$, and regardless of the type of encoding used.

We claim:

1. Apparatus for servo-controlling the bias voltage of a light source whose power of emission is modulated by a control voltage which is the sum of a DC voltage called the "bias voltage" and a varying voltage called the "modulation voltage", that is centered on a zero voltage; said modulation voltage being capable of taking at least two discrete values to represent a string of digital values having a fixed rate; the power emitted by said source being a function of the control voltage which function is at least approximately symmetrical about an "optimum" value of the bias voltage when the control voltage varies over a range of values centered on said optimum value of the bias voltage; and said optimum voltage being liable to drift;

the apparatus including:
. means for taking off a fraction of the optical signal emitted by the source and for converting it into an electrical signal referred to as the "take-off" signal;
. means for detecting any possible difference in need of correction between the value of the bias voltage and its optimum value; and
. means for deducing a new value of the bias voltage if there is a difference to be corrected, which new value is closer to the optimum value;

wherein the means for detecting possible difference comprise:
. means for determining the amplitude of a spectrum line in the take-off signal that is centered on a frequency equal to the rate of the digital values; and
. means for determining whether or not there exists a difference that needs to be corrected, as a function of the amplitude of said spectrum line.

2. Apparatus according to claim 1, wherein the means for detecting a possible difference to be corrected between the value of the bias voltage and its optimum value include:
. a bandpass filter tuned to the rate of the digital values, in order to filter the take-off signal; and
. an amplitude detector having a time constant that is much greater than the period of the digital values, for the purpose of determining the amplitude of the filtered signal, said amplitude representing the amplitude of the spectrum line centered on the frequency equal to the rate of the digital values.

3. Apparatus according to claim 1, wherein the means for deducing a new value of the bias voltage include:
. means for incrementing the value of the bias voltage and for verifying that such incrementation reduces the amplitude of the filtered signal; and
. means for decrementing the value of the bias voltage, and for verifying that such decrementation reduces the amplitude of the filtered signal.

* * * * *